Figure 1:
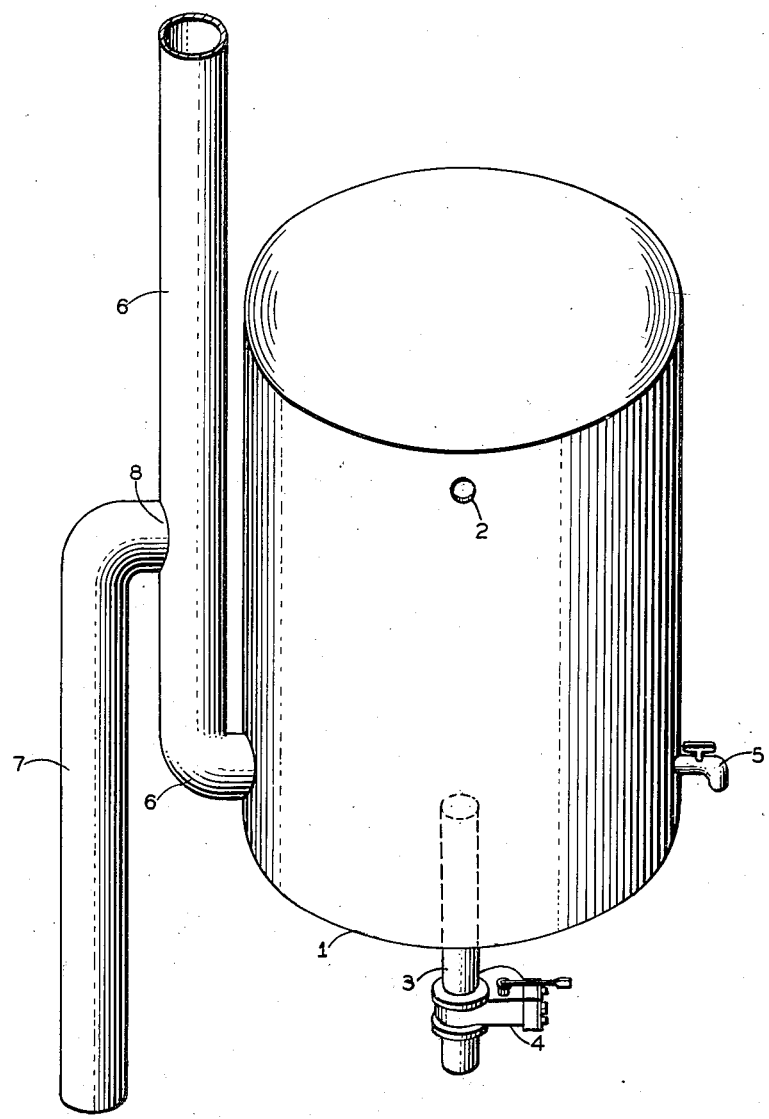

March 11, 1952     F. W. VON TUNGELN     2,588,437
SEDIMENT TRAP
Filed Dec. 9, 1946

INVENTOR.
FRANK W. VON TUNGELN
BY
ATTORNEY

Patented Mar. 11, 1952

2,588,437

UNITED STATES PATENT OFFICE 2,588,437

SEDIMENT TRAP

Frank W. Von Tungeln, United States Navy,
Philadelphia, Pa.

Application December 9, 1946, Serial No. 715,123

2 Claims. (Cl. 210—51)

(Granted under the act of March 3, 1883, as
amended April 30, 1928; 370 O. G. 757)

This invention relates to a new and useful improvement in a water sediment trap which is particularly suitable for use in a rain-water collecting system.

It has been the practice throughout the ages to collect rainfall in storage tanks or cisterns for future use. While water as it falls from the skies in the form of rain is clean and "chemically soft" upon hitting the surface of the ground or any other object, such as a roof of a building, it becomes contaminated with the loose material lying on these surfaces as they are carried along with the flow. Various methods have been employed for the purification of the water as gathered from surfaces during and after a rainfall many of which have employed some means of settling out the contaminating dirt and solid matter by allowing the water to stand for a period of time in a container, tank or cistern. This method of clearing the sediment from the rainfall as collected from roofs of buildings or other surfaces, has the objection that the settling process requires a considerable period of time and results in an increasing accumulation of sediment. The first run of water contains practically all the loose sediment on the surfaces contacted by said water so that after these surfaces are immediately washed clean the run-off water during the remainder of that particular rainfall period will be free from sediment to a large degree.

The principal object of this invention is to trap the first run of water from the collecting surface, such as, for instance, the roof of a building, into a small receptacle so that after it has filled to a given level with the dirty water the remaining water will then flow on into the main containers as clean, uncontaminated water.

A further object of this invention is to provide a receptacle with a suitable drain so that the trapped water, sediment and contamination may be drawn off and disposed of making the system ready to repeat the cleansing operation at the next period of rainfall.

Another object of this invention is to provide a sediment trap with rain water conductors so connected as to intercept the first flow of dirty water after which the clean water will go to the reservoir.

And a further object of this invention is to provide a receptacle with a draw-off cock, or valve, so located that clean water may be drawn off above the sediment level, after the sediment has settled.

And a still further object of this invention is to prevent the accumulation of contaminating sediment in main reservoirs by means such as a trapping receptacle for intercepting the first flow of rain water from the collecting surface.

These and other objects of this invention and the various features and details of the construction, operation and use thereof, are hereinafter more fully set forth and described with reference to the accompanying drawing in which like numbers refer to like parts and in which the figure is an isometric view of the sediment receptacle.

Referring now to the drawing, numeral 1 designates a closed tank or receptacle of any selected shape, such as cylindrical, made of any suitable material such as, for instance, galvanized sheet-iron, and with vent pipe connection at 2. Fastened securely in the bottom of said tank 1 is a drain pipe 3 that is opened and closed through a dump valve 4. A drain-off valve 5 allows water, after settling and free of sediment, to be drawn out of tank 1 at this point.

The operation is such that rain water gathered from a roof flows down a pipe 6 into tank 1, carrying with it sediment and contamination until the water level in said tank 1 rises to such a height as to back up the water in pipe 6 to the junction of said pipe 6, with a pipe 7, at point 8. The water, now clear of sediment, continues to flow through pipes 6 and 7 into the main reservoir.

While a particular embodiment of this invention has been illustrated and described herein, it is not intended that this invention be limited to such disclosure, and changes and modifications may be made and incorporated within the scope of the claims.

The invention described herein may be manufactured and used by or for the Government of the United States of America for governmental purposes without the payment of any royalties thereon or therefor.

I claim:

1. A sediment trap to collect rain water from roof spouts or other surface collecting means, said sediment trap consisting of a vertical pipe having an upper end and a lower end, said upper end constituting a rain water inlet for receiving water from said surface collecting means, a vented tank provided with a side wall and bottom, said lower end of said pipe having an elbow in communication with an opening in the side wall of said tank near the bottom of said tank, a drain pipe in the bottom of said tank and provided with a dump valve, and a T-connection in said vertical pipe at a level above said elbow for delivering clean rain water to a storage means from said vertical pipe after the first run of water from the surface collecting means during a rain which has filled the tank to said level.

2. The sediment trap of claim 1, and a draw-off cock in said side of the tank and located below said T-connection for withdrawing clean water directly from said tank after the sediment in the collected water has settled.

FRANK W. VON TUNGELN.

REFERENCES CITED

The following references are of record in the file of this patent:

UNITED STATES PATENTS

| Number | Name | Date |
|---|---|---|
| 342,616 | Liggett | May 25, 1886 |
| 669,193 | Alexander | Mar. 5, 1901 |
| 704,664 | Perkins | July 15, 1902 |
| 774,233 | Cox | Nov. 8, 1904 |
| 1,276,339 | Everett | Aug. 20, 1918 |
| 1,312,699 | McGrath | Aug. 12, 1919 |
| 2,142,888 | Donnallon | Jan. 3, 1939 |